N. R. LOURIE.
FALSE TOOTH AND SUPPORTING MEANS THEREFOR.
APPLICATION FILED FEB. 14, 1920.
1,400,613. Patented Dec. 20, 1921.
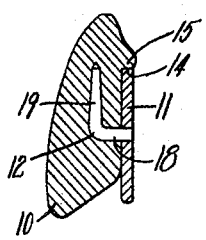 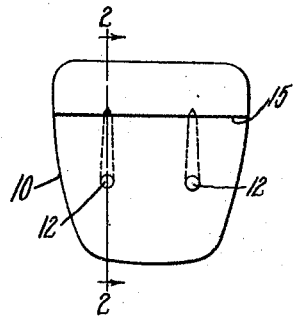 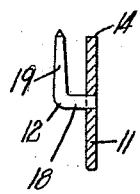
Fig. 2. Fig. 1. Fig. 3.
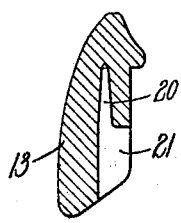 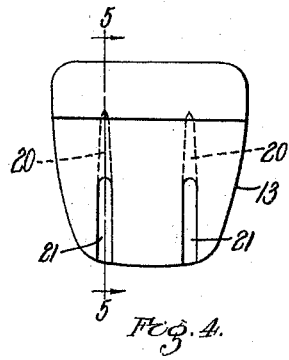 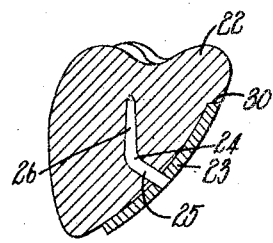
Fig. 5. Fig. 4. Fig. 6.
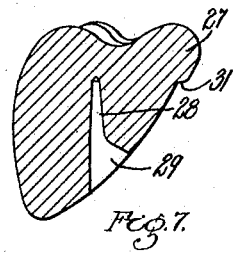
Fig. 7.
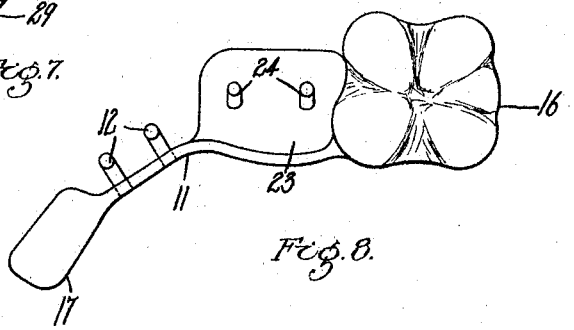
Fig. 8.
Inventor:
Nicholas R. Lourie,
by his attorney

UNITED STATES PATENT OFFICE.

NICHOLAS R. LOURIE, OF GLOUCESTER, MASSACHUSETTS.

FALSE TOOTH AND SUPPORTING MEANS THEREFOR.

1,400,613.  Specification of Letters Patent.  Patented Dec. 20, 1921.

Application filed February 14, 1920. Serial No. 358,650.

*To all whom it may concern:*

Be it known that I, NICHOLAS R. LOURIE, a citizen of the United States, residing at Gloucester, in the county of Essex and State of Massachusetts, have invented new and useful Improvements in False Teeth and Supporting Means Therefor, of which the following is a specification.

This invention relates to an improvement in false teeth and the supporting means therefor.

The object of the invention is to provide a false tooth and a support therefor which will hold the tooth firmly and strongly in position in the mouth of the wearer and which support, in case of the tooth breaking, is so constructed that another tooth of novel construction and form can be readily attached to said support and firmly locked in position thereon.

The invention consists in the combination and arrangement of parts set forth in the following specification and particularly pointed out in the claim thereof.

Referring to the drawings:

Figure 1 is a rear elevation of a tooth embodying my invention;

Fig. 2 is a sectional elevation taken on line 2—2, Fig. 1, illustrating the tooth and its supporting pin attached to a plate;

Fig. 3 is a sectional elevation of the supporting plate and pin in detail;

Fig. 4 is a rear elevation of a tooth used for replacement;

Fig. 5 is a sectional elevation taken on line 5—5, Fig. 4;

Fig. 6 is a sectional elevation illustrating my invention embodied in a molar tooth;

Fig. 7 is a sectional elevation of a molar tooth for replacement purposes;

Fig. 8 is a plan view of a bridge embodying my invention;

Like numerals refer to like parts throughout the several views of the drawings.

In the drawings, referring to Figs. 1, 2 and 3, 10 is a front tooth, 11 is a plate, 12—12 are pins which are molded in the tooth 10 and project rearwardly therefrom and are baked therein. Said pins are attached to a supporting plate 11 either by brazing, soldering or riveting, thus producing the combination of parts illustrated in Fig. 2. The upper edge 14 of the plate 11 abuts against a shoulder 15 formed upon the tooth 10 adjacent the upper end thereof. It will be seen that by the construction hereinbefore set forth the upper surface or grinding surface of the tooth is entirely free of any metal plate. In practice the metal plate 11 terminates at its opposite ends in caps 16 and 17 and forms what is known as a bridge; see Fig. 8. The pins 12 extend horizontally outward from the plate 11 as at 18 and then extend vertically upward as at 19 within said tooth, thus forming preferably a right angle pin 12. If in use the tooth 10 should become broken, it is removed from the plate 11 and pins 12 and this leaves the plate and pins in the form illustrated in Fig. 3. To replace the broken tooth, I provide a tooth 13, such as illustrated in section in Fig. 5 and in elevation in Fig. 4, said tooth being provided with a pair of vertical bores 20, the lower ends of each of said bores terminating in an opening 21 which extends from the rear side of said tooth and continuously therefrom across the bottom thereof into vertical alinement with said bore. The replacement tooth 13 is attached to the plate and right-angled pins 12 by slipping the same longitudinally thereof upon said pins, the vertical portions 19 of said pins first passing through the openings 21 and the tooth is then pressed downwardly upon the pins so that the vertical portions 19 of said pins enter the vertical bores 20. Cement is used in this operation to securely fasten the pins in the bores 20, the rear side of the tooth against the plate 11, and also cement is used to fill that portion of the openings 21 which is not filled by the portions 18 of said pins.

In Fig. 6 a molar tooth 22 is illustrated, which is connected to a plate 23 by pins 24. In this case the pins 24, while having one portion 25 extending at an angle to another portion 26 thereof, are not right-angle pins but the portion 25 of the pin is substantially at right angles to the surface of the plate 23 and the portion 26 of the pin extends vertically within said tooth.

In Fig. 7 a replacement tooth 27 is illustrated which can be used to replace a tooth of the style illustrated in Fig. 6. This tooth has vertical bores 28 therein to fit the vertical portions 26 of the pins 24, Fig. 6, and has an opening 29 extending into the lower ends of the bores 28 from the rear face of the tooth. The upper edge of the plate 23 abuts against a shoulder 30 on the tooth 22 and against a like shoulder 31 on the tooth 27.

It will be evident from the foregoing description and illustration of my invention that the false teeth can be firmly and readily affixed to a plate and in case of the breaking of any one of said false teeth, it can be readily replaced by another as hereinbefore described without soldering or vulcanizing.

In addition to these advantages, it is evident that much less gold will be necessary in the construction of the bridge and also that less gold will be visible as the plate 11 does not extend over the upper surface of the tooth but is entirely hidden from view when in position for use.

I claim:

In combination, a false tooth, a supporting plate therefor and a pin fast to said supporting plate and extending horizontally outward therefrom into said tooth and thence upwardly in said tooth in which it is embedded, the upper edge of said plate abutting against a shoulder on said tooth.

In testimony whereof I have hereunto set my hand in presence of two subscribing witnesses.

NICHOLAS R. LOURIE.

Witnesses:
 FRANKLIN E. LOW,
 CHARLES S. GOODING.